United States Patent [19]

Tsuji

[11] Patent Number: 4,934,184
[45] Date of Patent: Jun. 19, 1990

[54] METHOD OF DETECTING DEFECTS IN PNEUMATIC TIRE IN NON-DESTRUCTIVE MANNER

[75] Inventor: Naotaka Tsuji, Tokyo, Japan
[73] Assignee: Bridgestone Corporation, Tokyo, Japan
[21] Appl. No.: 284,527
[22] Filed: Dec. 15, 1988
[30] Foreign Application Priority Data Dec. 25, 1987 [JP] Japan .................................. 62-328897

[51] Int. Cl.$^5$ .......................................... G01M 17/02
[52] U.S. Cl. ..................................................... 73/146
[58] Field of Search ............................. 73/146; 340/58

[56] References Cited

U.S. PATENT DOCUMENTS

| 3,303,571 | 2/1967 | Veals | 73/146 |
| 3,719,813 | 3/1973 | Friedman et al. | 73/146 |
| 4,402,218 | 9/1983 | Engel | 73/146 |
| 4,475,384 | 10/1984 | Christie | 73/146 |

FOREIGN PATENT DOCUMENTS 57-167239 10/1982 Japan .
57-167240 10/1982 Japan .
62-298744 12/1987 Japan .

*Primary Examiner*—Donald O. Woodiel
*Attorney, Agent, or Firm*—Sughrue, Mion, Zinn, Macpeak & Seas

[57] ABSTRACT

Defects such as separations formed within a pneumatic tire are detected in the non-destructive manner by rotating the inflated tire with respect to a pair of displacement sensors which are urged against an outer surface of the tire at a substantially zero pressure and a higher pressure, respectively, measuring displacement values of the sensors over one revolution of the tire, and deriving differences between displacement values at corresponding measuring points on the tire surface. The defects can be detected precisely without being affected by the deformation and radial runout of the tire itself.

12 Claims, 2 Drawing Sheets

FIG_1
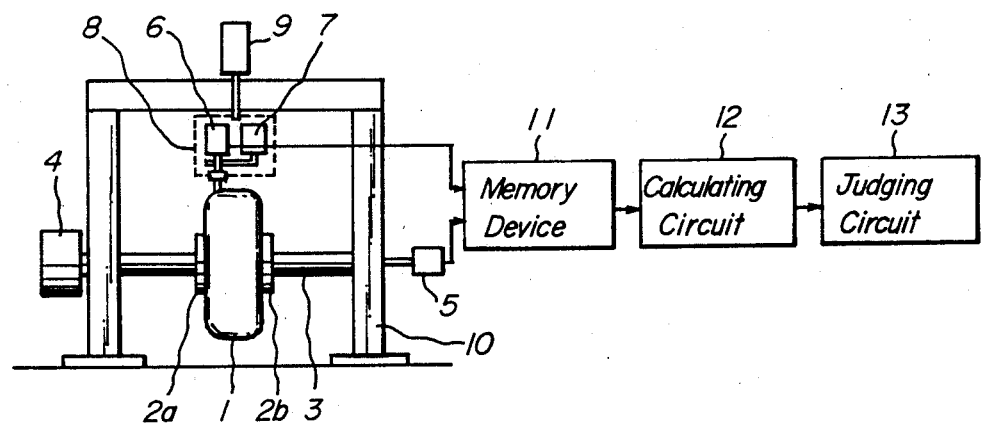
FIG_2
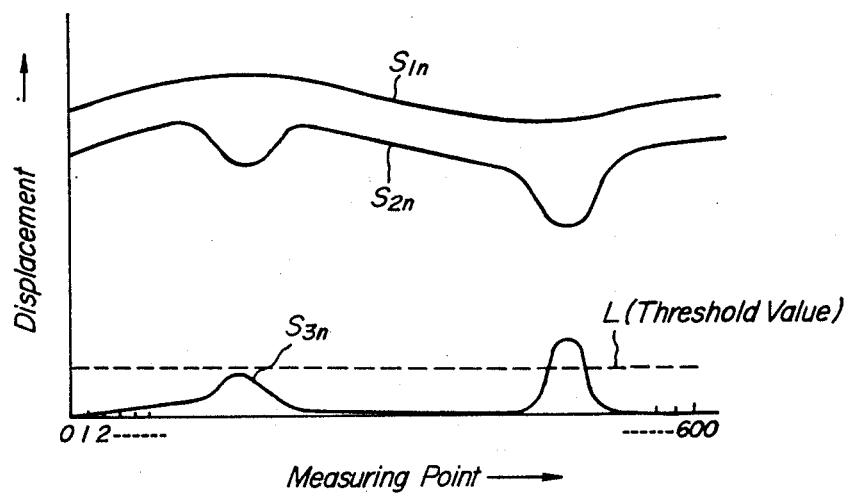

FIG_3
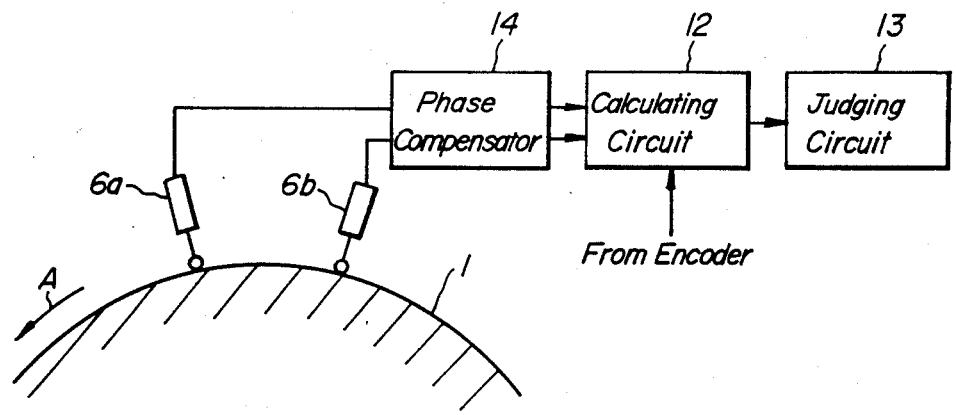
FIG_4
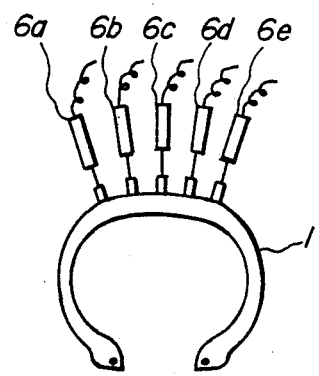

METHOD OF DETECTING DEFECTS IN PNEUMATIC TIRE IN NON-DESTRUCTIVE MANNER

BACKGROUND OF THE INVENTION

Field of the Invention and Related Art Statement

The present invention generally relates to a method of detecting defects formed inside a pneumatic tire in the non-destructive manner, and more particularly relates to a method of detecting rubber belt separations formed in the vicinity of an outer surface of a used tire whose tread surface has been buffed off in order to manufacture a renewed tire or in the vicinity of a smooth outer surface of a special tire such as racing tire.

In case of manufacturing a renewed tire, a tread surface of a used tire is first ground off to obtain a substrate tire having a smooth surface, and then a new tread rubber is applied in the substrate tire. In order to keep the desired property of the renewed tire, it is necessary that the substrate tire does not include large separations formed between laminated rubber belts. In order to detect the separation, it has been practiced to monitor the outer appearance of the substrate tire or hit the substrate tire with a hammer. However, this checking method requires the great experience of an operator and sometimes undesired separations might not be detected correctly. Therefore, it has been desired to develop a method of automatically detecting defects in the tire in the non-destructive manner.

There has been proposed the following methods of detecting the separations in the pneumatic tire in the non-destructive manner.

(a) Method of utilizing holography or cialography
(b) Method of utilizing an ultrasonic defect detector
(c) Method of utilizing displacement sensors In the first method (a), a number of images of a tire surface are taken and defects in the tire are detected by processing these images usually with the aid of a computer. In the second method (b), the ultrasonic wave is transmitted through the tire to obtain a cross sectional construction of the tire and defects are detected by analyzing the cross sectional construction. The third method (c) is disclosed in copending Japanese Patent Laid-open Publication, Kokai sho No. 62-298,744 laid-open on Dec. 25, 1987. In this method a pair of roller pushers are urged against an inner wall of a tire and displacements of the roller pushers in a direction perpendicular to the tire surface are measured. Defects in the tire are detected by comparing the thus measured displacements with each other.

In the first and second known methods, the apparatus for detecting the defects is liable to be complicated in construction and large in size, so that the apparatus becomes quite expensive. The first method (a) has a relatively high detecting precision and a small defect having a diameter of about 5~10 mm can be detected, but it requires a skill of an operator. Further, the operation of detecting the defects is very cumbersome. In the second known method (b), the operation is easier than the first method (a), but has a lower precision. That is to say, defects having diameters smaller than 30 mm could not be effectively detected. Further, in order to remove the influence of ambient noise, the measuring space must be shielded, so that an extra cost is needed.

In the third method (c), since the roller pushers are urged against the inner surface of the tire, it is difficult to detect defects formed in the vicinity of the outer surface of the tire. It has been found by experience that defects are liable to be generated not in the vicinity of the inner surface of tire, but in the vicinity of the outer surface thereof. Further, since the roller pushers are pressed against the inner surface of the tire, the tire could not be inflated. Therefore, the tire is deformed to a great extent, and thus the displacement of the pushers is largely influenced upon the deformation of the tire itself and the signal-to-noise ratio of the detected signal becomes very small.

SUMMARY OF THE INVENTION

The present invention has for its object to provide a novel and useful method of detecting defects in a tire in the non-destructive manner, in which small defects can be detected precisely without being affected by the deformation of the tire itself in an easy manner with the aid of an apparatus which is simple in construction, small in size and cheap in cost.

According to the invention a method of detecting defects in a pneumatic tire in the non-destructive manner comprises the steps of:

measuring displacement data at a plurality of measuring points set along a circumferential line on an outer surface of an inflated pneumatic tire with the aid of at least one displacement sensor, said displacement data including a first displacement value at substantially zero pressure and a second displacement value at a predetermined non-zero pressure at respective measuring points;

deriving a series of differences between first and second displacement values at successive corresponding measuring points; and detecting defects in the tire by processing said series of differences.

In a preferable embodiment of the method according to the invention, the inflated tire is rotated at a constant speed and first and second displacement sensors are urged against the outer surface of the tire, the first and second displacement sensors being aligned in the circumferential direction of the tire, i.e. the first and second displacement sensors being arranged to follow the same circumferential locus on the outer surface of the tire. The first displacement sensor is urged against the outer surface of the tire substantially at the zero pressure, e.g. 0.3~0.5 kg/cm$^2$, and the second displacement sensor is urged against the outer surface of the tire at a higher pressure of 4~30 kg/cm$^2$. Then, the displacements of the first and second sensors are detected at 600 measuring points equidistantly arranged along the circumferential direction of the tire surface. A series of differences between the displacements measured at corresponding measuring points is derived, and further a deviation in the difference is derived. Then, defects are detected by comparing the deviation with a threshold value.

BRIEF DESCRIPTION OF THE DRAWINGS

FIG. 1 is a schematic view illustrating the whole construction of an apparatus for carrying out an embodiment of the method according to the invention;

FIG. 2 is a graph for explaining the principle of the defect detecting method according to the invention;

FIG. 3 is a schematic view depicting a major part of an apparatus for carrying out another embodiment of the method according to the invention; and FIG. 4 is a schematic view illustrating another embodiment of the arrangement of displacement sensors.

DESCRIPTION OF THE PREFERRED EMBODIMENT

FIG. 1 is a schematic view showing the whole construction of the apparatus for carrying out the method according to the invention. The apparatus comprises half limbs 2a, 2b for supporting a pneumatic tire 1, a shaft 3 secured to the half limbs, a motor 4 coupled with one end of the shaft, a rotary encoder 5 secured to the other end of the shaft and generating pulses representing the rotation of the tire, a displacement sensor 6 having a roller provided at its lower end, a pressure cylinder 7 for applying a given pressure to the displacement sensor 6, the pressure being applied in a direction perpendicular to the center axis of shaft 3, a position adjusting device 9 for moving a frame 8 which supports the pressure cylinder 7 movably up and down as well as in the direction parallel to the shaft 3, a base frame 10 which supports the shaft 3 rotatably, the motor 4, the rotary encoder 5 and the position adjusting device 9 slidably, a memory device 11 connected to output terminals of the encoder 5 and displacement sensor 6, an operating circuit 12 connected to the memory device 11 and a judging circuit 13 connected to the operating circuit 12.

Defects in the tire 1 can be detected in the following manner.

The tire 1 such as a substrate tire for use in manufacturing a renewed tire is supported by the half limbs 2a, 2b and shaft 3, and then the air is introduced into the tire such that the inside pressure amounts to a given pressure within a range of about 0.5~5.0 kg/cm². The inside pressure should be so high that the tire is not deformed as a whole during the measurement, but should be low such that the outer surface is depressed when the displacement sensor is urged against the tire at the high pressure. It should be noted that the inside pressure during the measurement is sufficiently lower than the normal pressure of 6~8 kg/cm². Then the motor 4 is energized and the tire 1 is rotated at a constant speed of one revolution per minute by means of the shaft 3. It should be noted that in the present embodiment, it is not necessary to rotate the tire at the constant speed, but it is preferable to do so. Then the frame 8 is descended with the aid of the position adjusting device 9 until the roller of the displacement sensor 6 is brought into contact with the outer surface of the tire 1. At first, the pressure cylinder 7 is so driven that the roller is urged against the tire at a substantially zero pressure, so that the roller can be moved freely in the radial direction of the tire in accordance with the contour configuration of the outer surface of the tire. For instance, the roller of the displacement sensor 6 is urged against the tire surface at the pressure of 0.3~0.5 kg/cm². It should be noted that under such a low pressure, the tire surface is not substantially deformed, so that in the present specification such a low pressure is called the substantially zero pressure.

The pulses generated from the rotary encoder 5 are counted by a counter provided in the memory device 11, the counter being reset every time the tire has rotated by one revolution. The encoder 5 generates 600 pulses during one revolution of the tire, and these pulses are used as sampling pulses to store displacement values supplied from the displacement sensor 6. That is to say, the displacement of the roller of the sensor 6 is measured at 600 measuring points equidistantly set along the circumference of the outer surface of the tire 1. The displacement values represent the variation in the distance from the center axis of the shaft 3 to the roller of the displacement sensor 6. After the displacement values for one revolution of the tire 1 have been measured and stored in the memory device 11, the pressure cylinder 7 is driven to change the pressure of the roller against the outer surface of the tire into a higher value of 4~30 kg/cm², preferably 4~12 kg/cm². Then the displacement is measured again at the same measuring points and 600 displacement values are stored in the memory device 11. The higher pressure has to be set such that the tire surface is deformed meaningfully.

Then the calculating circuit 12 performs the following calculations on the basis of the two sets of six hundreds measured displacement values.

(a) The two sets of six hundreds displacement values measured under the different pressures are first synchronized with each other so that two displacement values measured at the same measuring point are paired.

(b) Now it is assumed that the six hundreds displacement values measured under the substantially zero pressure are represented by $S_{1n}(n=1, 2 \ldots 600)$ and those measured under the high pressure are denoted by $S_{2n}(n=1, 2 \ldots 600)$. Then, a series of differences $\Delta S_n$ between the paired displacement values at corresponding measuring points are derived in accordance with the following equation.

$$\Delta S_n = S_{1n} - S_{2n} \tag{1}$$

FIG. 2 shows curves representing the displacement values $S_{1n}$ and $S_{2n}$ measured under the different pressures. As illustrated in FIG. 2, when rubber belts within the tire are partially separated, so that there are formed voids within the tire, the displacement value $S_{2n}$ is varied to a large extent at the separations, but the displacement value $S_{1n}$ is not substantially changed at the separation. Therefore, the difference $\Delta S$ is remarkably changed at the separation.

(c) Detect the minimum value $\Delta S_n(\text{Min})$ of the differences $\Delta S_n$, and then a deviation $S_{3n}$ is calculated in accordance with the following equation.

$$S_{3n} = \Delta S_n - \Delta S_n(\text{Min}) \tag{2}$$

Next, the judging circuit 13 determines whether or not the tire includes defects in accordance with the deviation $S_{3n}$. That is to say, the deviation $S_{3n}$ is compared with a threshold value L and when the deviation is equal to or larger than the threshold value ($S_{3n} \geq L$), it is judged that the tire includes a large defect, but when $S_{3n} < L$ is detected, the tire is judged to be a good one which does not include a large defect or includes only small defects which do not cause any trouble.

FIG. 3 is a schematic view illustrating another embodiment of the apparatus for carrying out the method according to the invention. In the present embodiment, first and second displacement sensors 6a and 6b are arranged such that they can trace the same locus along the circumference of the outer surface of the tire 1, said first and second displacement sensors being separated by a predetermined distance viewed in the circumferential directions. The roller of first displacement sensor 6a is urged against the tire surface at the substantially zero pressure and the roller of second displacement sensor 6b is urged against the tire surface at the higher pressure. The output signals generated by the first and second displacement sensors 6a and 6b are supplied to a phase compensator 14 including a delay element for delaying the output signal from the first displacement sensor 6a by a delay time which is equal to a time period during which the tire 1 is rotated in the direction shown by an arrow A at a constant speed from the second sensor 6b to the first sensor 6a. Therefore, at the outputs of the phase compensator 14, there are appeared displacement values detected by the first and second displacement sensors 6a and 6b at the same measuring point on the tire surface. Then, these displacement values are supplied to the calculation circuit 12 to which the pulses generated by the rotary encoder not shown in FIG. 3 are also supplied. In the calculating circuit 12, the above mentioned calculations are carried out in the same manner as that explained in connection with the first embodiment to derive the deviation $\Delta S_n$ which is then supplied to the judging circuit 13. In the present embodiment, the detecting time period can be shortened to a large extent as compared with the first embodiment, because the displacement values $S_{1n}$ and $S_{2n}$ can be obtained substantially simultaneously and it is not necessary to change the pressure of the displacement sensors. In general, the measuring time may be shorter than a half of that of the previous embodiment. Further, the memory device can be replaced by the simple and inexpensive phase compensator, so that the cost of the whole apparatus can be reduced.

The present invention is not limited to the embodiments explained above, but many modifications and alternations may be conceived by those skilled in the art within the scope of the invention. In the above embodiments, six hundreds measuring points are set along the single circumferential line around the outer surface of the tire. It should be noted that the same measurement may be repeated by plural times along a plurality of parallel circumferential lines such that a whole outer surface of the tire is checked. In this case, five sets of displacement sensors or five displacement sensors 6a~6e may be arranged within a range between edges of a third belt of the tire 1 as illustrated in FIG. 4. In this case, the displacement data may be obtained simultaneously from the five sets of the displacement sensors 6a~6e. In case of using the apparatus shown in FIG. 1, the position of the displacement sensor 6 may be shifted in the direction of the width of the tire by means of the position adjusting device 9. Then the displacement is measured along successive circumferential lines.

Further, the measurement of the displacement may be carried out by plural times, while the inside pressure of the tire is changed to different values, and the results of these measurements may be compared with each other. In this manner, the accuracy of the detection can be further increased.

As explained above, in the defect detecting method according to the invention, the displacement of the outer tire surface is measured at two pressures, one being substantially zero and the other being the higher pressure, and the difference between the displacements at the same measuring point is derived to detect the defect, and therefore, the true defect of the tire can be precisely detected without being affected by the deformation of the tire. That is to say, since the tire is inflated to such an extent that the tire is not easily deformed owing to its weight, and further the deformation of the tire itself such as the radial runout can be canceled out in the difference between the measured displacement values. Moreover, since the displacement sensor or sensors are urged against the outer surface of the tire, the defect, i.e. the separation between successive rubber belts can be detected at a high sensitivity, because the separations are usually generated in the vicinity of the outer surface of the tire, so that only a small rubber layer is existent between the separations and the outer surface of the tire against which the displacement sensor is urged.

What is claimed is:

1. A method of detecting defects in a pneumatic tire comprising the steps of
    measuring displacement data at a plurality of measuring points set along a circumferential line on an outer surface of an inflated pneumatic tire with the aid of at least one displacement sensor, said displacement data including a first displacement value at substantially zero pressure and a second displacement value at a predetermined non-zero pressure at respective measuring points;
    deriving a series of differences between first and second displacement values at successive corresponding measuring points; and
    detecting defects in the tire by processing said series of differences.

2. A method according to claim 1, wherein the first displacement values are measured by urging the displacement sensor against the outer surface of the tire at a pressure within a range of 0.3~0.5 kg/cm$^2$, and the second displacement values are measured by urging the displacement sensor against the outer surface of the tire at a pressure within a range of 4~30 kg/cm$^2$, preferably 4~12 kg/cm$^2$.

3. A method according to claim 2, wherein said tire is inflated at such an inside pressure that the tire is hardly deformed owing to its weight, but is easily deformed by means of the displacement sensor.

4. A method according to claim 3, wherein the tire is inflated at the inside pressure of about 0.5~5.0 kg/cm$^2$.

5. A method according to claim 1, wherein the first displacement values are measured by urging a single displacement sensor against the outer surface of the tire along the circumferential line at the substantially zero pressure, while the tire is rotated by at least one revolution, and the second displacement values are measured by urging the same displacement sensor against the outer surface of the tire along the same circumferential line at the higher pressure, while the tire is rotated by at least one revolution.

6. A method according to claim 5, wherein the first and second displacement values are stored in a memory device and then are read out of the memory device such that first and second displacement values at the same measuring point are paired, and then said series of differences is derived from the paired displacement values.

7. A method according to claim 1, wherein said first and second displacement values are measured by urging first and second displacement sensors against the outer surface of the tire along the same circumferential line at the substantially zero pressure and the higher pressure, respectively, while the tire is rotated by at least one revolution.

8. A method according to claim 7, wherein one of the first and second displacement values is delayed by such a time period during which the tire is rotated over a distance from the other of first and second displacement sensors to the one of the first and second displacement sensors, and said series of differences is derived from delayed and non delayed first and second displacement values.

9. A method according to claim 1, wherein a plurality of measurements of the first and second displacement values along a plurality of circumferential lines over the outer surface of the tire are carried out.

10. A method according to claim 9, wherein said plurality of measurements along the plurality of circumferential lines are carried out by moving at least one displacement sensor in a direction of a width of the tire.

11. A method according to claim 9, wherein said plurality of measurements along the plurality of circumferential lines are carried out simultaneously by means of a plurality of displacement sensors which are arranged separately from each other in a direction of a width of the tire.

12. A method according to claim 1, wherein said step of detecting defects includes a step of deriving the minimum difference among said series of differences, a step of deriving a deviation of the differences with respect to the minimum differences, and a step of comparing the deviation with a threshold value.

* * * * *